(12) United States Patent
Sananes et al.

(10) Patent No.: US 10,243,915 B2
(45) Date of Patent: Mar. 26, 2019

(54) METHOD AND SYSTEM FOR MANAGING FLAT AND ROUTED CLIENTS IN A CLUSTER USING SINGLE TYPE OF VIPS

(71) Applicant: Dell Products L.P., Round Rock, TX (US)

(72) Inventors: Yaron Sananes, Tel Aviv (IL); Felix Laura, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/985,530

(22) Filed: Dec. 31, 2015

(65) Prior Publication Data

US 2017/0195279 A1    Jul. 6, 2017

(51) Int. Cl.
*H04L 29/12*    (2006.01)
*H04L 12/26*    (2006.01)
*H04L 12/803*   (2013.01)
*H04L 29/08*    (2006.01)

(52) U.S. Cl.
CPC ............ *H04L 61/103* (2013.01); *H04L 43/08* (2013.01); *H04L 47/125* (2013.01); *H04L 61/6022* (2013.01); *H04L 69/324* (2013.01)

(58) Field of Classification Search
CPC ..... H04L 43/08; H04L 47/125; H04L 69/324; H04L 61/6022; H04L 61/103; G06F 9/45558
See application file for complete search history.

(56) References Cited

U.S. PATENT DOCUMENTS

| | | | | |
|---|---|---|---|---|
| 2013/0047151 A1* | 2/2013 | Sridharan | ........... | G06F 9/45558 718/1 |
| 2014/0019639 A1* | 1/2014 | Ueno | ................... | H04L 61/103 709/238 |
| 2014/0304418 A1* | 10/2014 | Torok | ................... | H04L 67/142 709/228 |
| 2016/0308822 A1* | 10/2016 | Chae | ................... | H04L 61/2007 |

OTHER PUBLICATIONS

Dell, Dell Compellent FS8600 Networking Best Practices Guide (Year: 2015).*

* cited by examiner

*Primary Examiner* — Vinncelas Louis
(74) *Attorney, Agent, or Firm* — Pearl Cohen Zedek Latzer Baratz LLP

(57) ABSTRACT

A method and a system for managing flat and routed clients in a cluster using single virtual IP (VIP) are provided herein. The method includes broadcasting an ARP request from a client to a cluster of nodes; monitoring the broadcasted ARP request at one of the nodes and ignoring the ARP request at all other nodes; in a case that the monitored ARP requests is associated with a different target VIP for same client IP, determining the client associated with the ARP request as a routed client, otherwise the client is determined as a flat client; applying at least one load balancing logic for assigning one of the nodes to the client associated with the ARP request, wherein both flat clients and routed clients are treated as independent clients counted separately; and notifying the client associated with the ARP of a MAC address of the assigned node.

18 Claims, 2 Drawing Sheets

METHOD AND SYSTEM FOR MANAGING FLAT AND ROUTED CLIENTS IN A CLUSTER USING SINGLE TYPE OF VIPS

FIELD OF THE INVENTION

The present invention relates generally to the field of computer networks, and more particularly to the network layer of such networks.

BACKGROUND OF THE INVENTION

In any computer network, on the network layer (L2) communication level, there can be two types of clients: flat clients which are connected directly to the network (e.g. via a switch) and routed clients which are connected to the network via a router.

Whenever a flat client such as 10A wishes to connect to a specific destination on the network (for example cluster 100), it has to issue a broadcast request. Such a request can be, for example in a form of Address Resolution Protocol (ARP) for Internet protocol version 4 (IPv4) or Neighbor Discovery Protocol NDP for Internet protocol version 6 (IPv6). An address resolution request includes a tuple of the form: (client IP, target IP) where the client IP is the IP address of, for example, client 10A and the target IP is the virtual IP address of cluster.

routed clients on the contrary are passing the data to their gateway (router) and expect the router to pass the data to the right destination. The router will issue the ARP request (as flat clients do) in order get the media access control (MAC) address of the controller to which the router should pass the data.

Many implementations utilize a domain names system (DNS) that holds several virtual IP (VIP) addresses associated with the cluster domain name. Whenever any client (flat or routed) wishes to access the cluster, the client first applies to the DNS with the domain name of the cluster and receive in return one of a plurality (e.g., M) of VIP addresses associated with cluster 100 which includes N controllers (e.g. 4). It is recommended, but not necessary to have M=N. The VIP addresses may be returned to the client in a form of round robin (e.g. each access to the DNS with the same domain name will return a consecutive VIP in an ordered list of M VIP addresses).

It should be noted that in a case of a cluster, either flat client or routed client are not aware that they are working with a cluster and therefore cluster actually presents itself as single black box rather than a plurality of nodes.

The address resolution request is then broadcasted from the client to the entire network (i.e., to all clients that are located on the same VLAN and same logical subnet).

In currently available networks that involve a cluster, one solution known in the art is to have each controller within the cluster has associated with two different IP addresses. One for flat network and one for routed network. Upon receiving a broadcast request, the operating system (i.e. kernel) is responsible to answer it based on the IP address (either flat or routed) and other factors.

The problem with the aforementioned solution is that the kernel has to maintain two sets of IP addresses for each controller.

SUMMARY OF THE INVENTION

Some embodiments of the present invention provide a method and a system for managing flat and routed clients in a cluster using single virtual internet protocol. The method includes: broadcasting an Address Resolution Protocol (ARP) request from a client to a cluster of nodes; monitoring the broadcasted ARP request at one of the nodes and ignoring the ARP request at all other nodes; in a case that the monitored ARP requests is associated with a different target Virtual Internet Protocol (VIP) for same client IP, determining the client associated with the ARP request as a routed client, otherwise the client is determined as a flat client; applying at least one load balancing logic for assigning one of the nodes to the client associated with the ARP request, wherein both flat clients and routed clients are treated as independent clients counted separately; and notifying the client associated with the ARP of a media access control (MAC) address of the assigned node.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
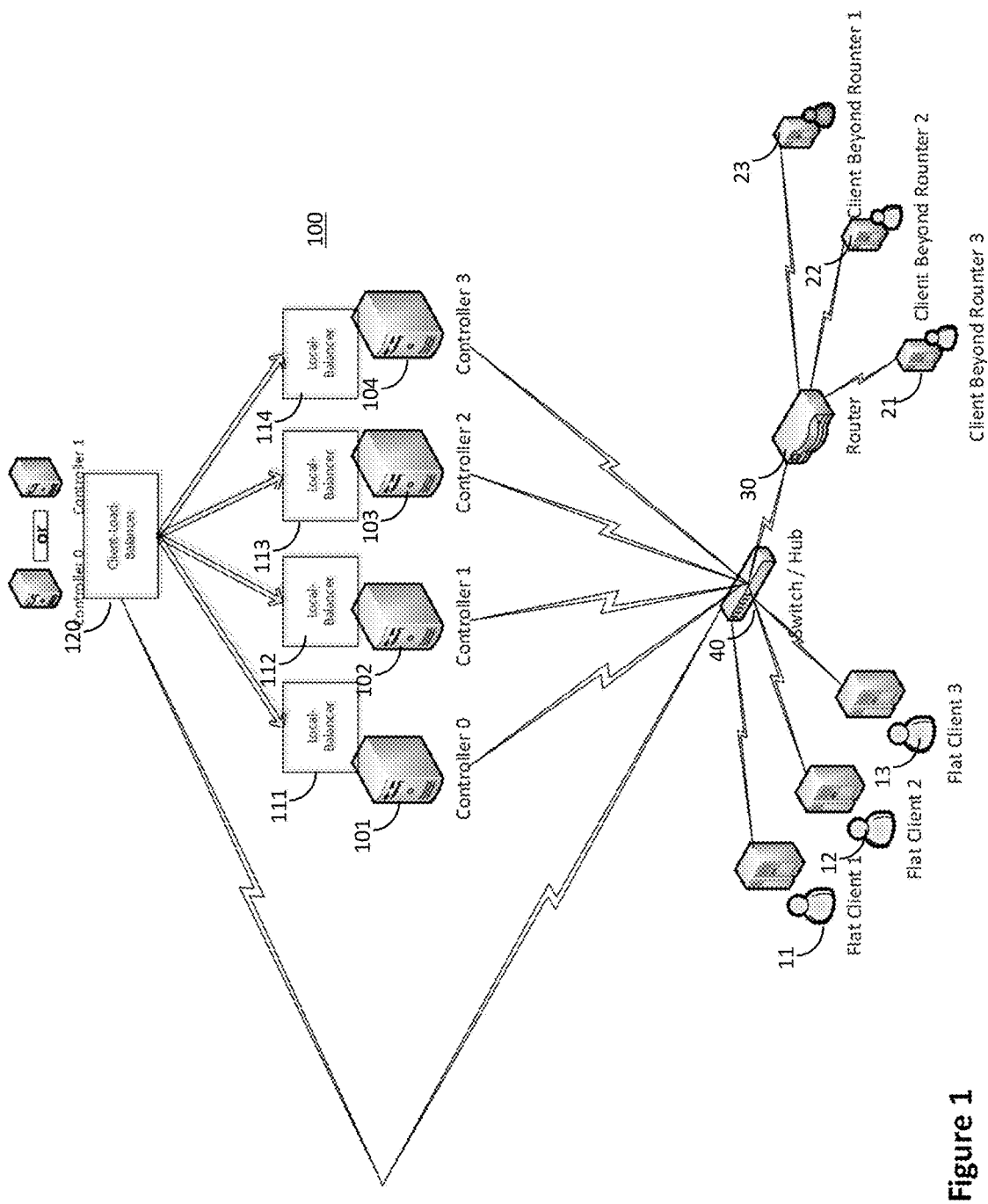
FIG. 1 is a block diagram illustrating non-limiting exemplary architecture of a system in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

FIG. 1 is a block diagram illustrating non-limiting exemplary architecture of a system in accordance with embodiments of the present invention. Cluster 100 includes a plurality of controllers (nodes) 101-104. A plurality of flat clients 11-13 are connected to cluster 100 directly via a switch or hub 40. Additionally, a plurality of routed clients 21-23 are connected to cluster 100 via router 30 and further via switch or hub 40.

In accordance with embodiments of the present invention, the operating system (kernel) is configured to ignore ARP requests altogether and instead there is a dedicated process that runs only on one of controllers 101-104 in the cluster and listens to all ARP requests broadcasted through the network. This process is denoted client load balancer 120.

Once such an ARP requests arrived at client load balancer 120, it decides on the allocation of the controller to the client and sends back via a respective process running on controllers 101-104 referred to as local load balancers 111-114 the corresponding MAC of the assigned controller.

When the address resolution request reaches the client load balancer process 120 running at one of the controllers 101-104, the fact that a specific address resolution request has a different target VIP for the same client IP is used to determine the requesting client as a router 30 that hides behind itself the routed clients 21-23. Advantageously, using single set of Virtual IPs the cluster 100 is reaching the best possible balance for flat and routed client. Moreover, the administrator doesn't have to maintain two set of VIPs, (one for flat client and one for routed clients)

It is noted that in case of a flat client 11-13, there is already a different client IP address but now also a different target VIP and so the new mechanism of using a DNS is used as part of the unified process but does not add more client identification. The use of a different target VIP address is leveraged to distinguish between different clients 21-23 that are behind the same router 30 (therefore same client IP) while maintaining the distinguishing between flat clients (which is straightforward, based on their different client IP).

The decision of the client load balancer, of which controller to assign, is carried out based on some load balancing algorithm and the MAC address associated with a specific controller is returned over the network to the requesting client which then connects to the specific controller using its MAC address. It is noted that each controller usually has several network adaptors having their own unique MAC address, thus, a controller is usually associated with several MAC addresses.

In order to achieve an efficient load balancing, client load balancer 120 assigns a different controller to any new client accessing the cluster. The client load balancer 120 holds a table for each assignment of a controller to a respective combination of: (client IP, target VIP).

When an existing client (11-13, 21-23) tried to access cluster 100, client load balancer 120 checks the table of connections and assigns a controller that is not yet connected to that client. If all controllers 101-104 are connected to that client, client load balancer 120 assigns the controller having least number of connections to that client. In a case that all controllers have an equal number of connections to that client, the client load balancer compares the total number of connected clients to each controller (no matter from each client) and choose the most idle controller. There are various criteria to determine which is the most idle controller (for example: minimum number of connections, minimum CPU load, and the like).

On a the controller level, a similar process is carried out locally by the local load balancers 111-114 which are processes that run on the controllers 101-104 respectively and assign any of the network adaptors to the requesting clients, by implementing a similar logic as applied by the client load balancer when assigning the controllers on the cluster level.

It is noted that the nature of the load balancing algorithm itself can be varied and illustrated herein using the metric of "number of connections" Other metrics can be used with a similar logic.

Figure 2:
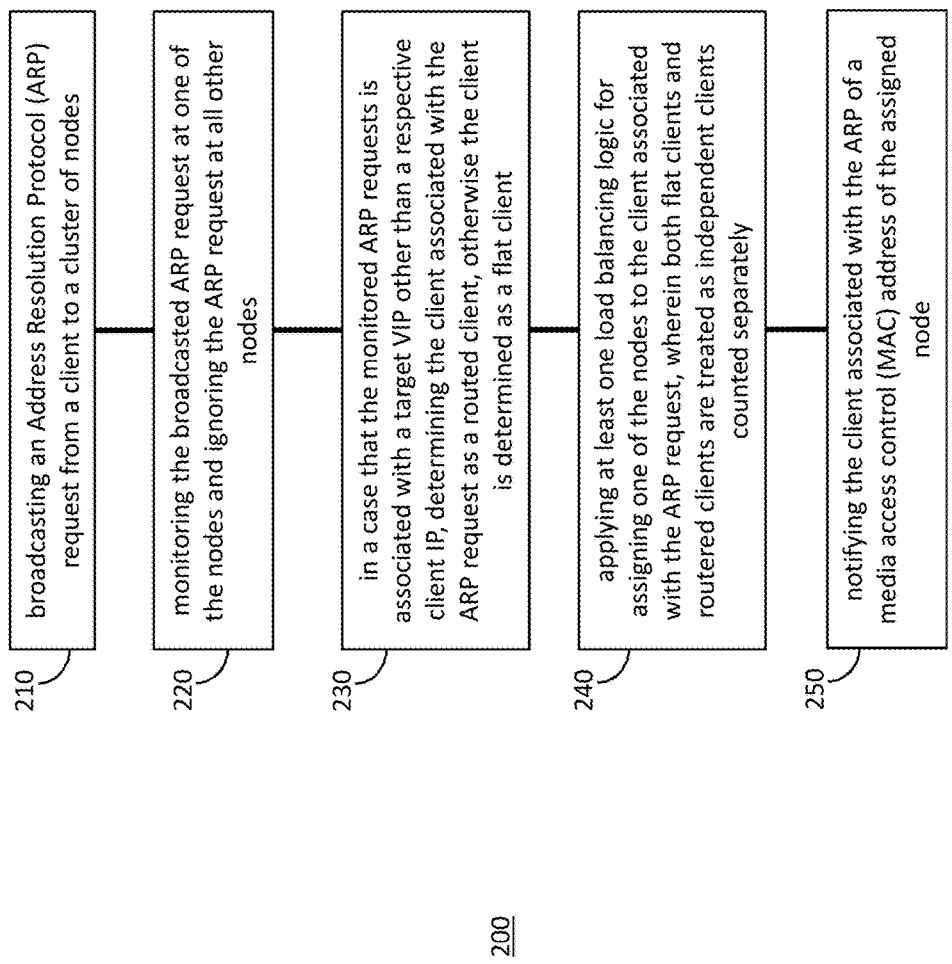
FIG. 2 is a high level flowchart illustrating another non-limiting exemplary method in accordance with embodiments of the present invention.

FIG. 2 is a high-level flowchart illustrating another non-limiting exemplary method in accordance with embodiments of the present invention. Method 200 may include the following steps: broadcasting an Address Resolution Protocol (ARP) request from a client to a cluster of nodes 210; monitoring the broadcasted ARP request at one of the nodes and ignoring the ARP request at all other nodes 220; in a case that the monitored ARP requests is associated with a target VIP other than a respective client IP, determining the client associated with the ARP request as a routed client, otherwise the client is determined as a flat client 230; applying at least one load balancing logic for assigning one of the nodes to the client associated with the ARP request, wherein both flat clients and routed clients are treated as independent clients counted separately 240; and notifying the client associated with the ARP of a media access control (MAC) address of the assigned node 250.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for managing flat and routed clients, using single virtual internet protocol, comprising:
   broadcasting an Address Resolution Protocol (ARP) request from any of the routed and flat clients, to a cluster of nodes;
   monitoring the broadcasted ARP request at one of the nodes and ignoring the ARP request at all other nodes;
   in a case that the monitored broadcast ARP request is associated with a different target Virtual Internet Protocol (VIP) for same client IP, determining the client associated with the ARP request as a routed client, and in case that the monitored broadcast ARP request is associated with a different target Virtual Internet Protocol (VIP) for a different client IP, determining the client as a flat client, wherein several Virtual Internet Protocols are associated with the cluster name domain;
   applying at least one load balancing logic for assigning one of the nodes to the client associated with the monitored broadcast ARP request, wherein both flat clients and routed clients are treated as independent clients, and wherein the assignment of the nodes to the both flat clients and routed clients is by using a single virtual internet protocol; and
   notifying the client associated with the monitored broadcast ARP request of a media access control (MAC) address of the assigned node.

2. The method according to claim 1, wherein the notifying is carried out by a process running on each of the nodes.

3. The method according to claim 1, wherein the load balancing logic comprises assigning a different node to any new client accessing the cluster.

4. The method according to claim 3, further comprising maintaining a table for each assignment of a node to a respective combination of: (client IP, target VIP) denoting a specific client.

5. The method according to claim 4, wherein when an existing client tries to access the cluster, checking the table of connections and assigning a node that is not yet connected to that client.

6. The method according to claim 5, wherein in a case that all nodes are connected to that client, assigning the node having least number of connections to that client.

7. The method according to claim 6, wherein a case that all nodes have an equal number of connections to that client, comparing the total number of connected clients to each node and selecting the most idle node.

8. The method according to claim 6, wherein, most idle node is determined based on a least one of: minimum number of connections, minimum CPU load.

9. The method according to claim 1, at least one of the nodes comprises a plurality of network adapters each having a unique MAC address, and further applying the logic of the load balancing on the node level.

10. A system for managing flat and routed clients, using single virtual internet protocol, comprising:
    a plurality of clients configured each to broadcast an Address Resolution Protocol (ARP) request to a cluster of nodes;
    a cluster of nodes connected the plurality of clients over an Internet network, wherein at least some of the clients are connected to the cluster via a router; and
    a client load balancer executed by a computer processor configured to monitor the broadcasted ARP request at one of the nodes whereas all other nodes are configured to ignore the ARP request,
    wherein in a case that the monitored ARP request is associated with a different target VIP for same client IP, the client load balancer determines the client associated with the monitored ARP request as a routed client, and in case that the monitored ARP request is associated with a different target Virtual Internet Protocol (VIP) for a different client IP, determining the client as a flat client and wherein several Virtual Internet Protocols are associated with the cluster name domain,
    wherein the client load balancer applies at least one load balancing logic for assigning one of the nodes to the client associated with the monitored ARP request, wherein both flat clients and routed clients are treated as independent clients counted separately,
    wherein the assignment of the nodes to the both flat clients and routed clients is by using a single virtual internet protocol, and
    wherein the client associated with the monitored ARP request is notified of a media access control (MAC) address of the assigned node.

11. The system according to claim 10, wherein the notifying is carried out by a process running on each of the nodes.

12. The system according to claim 10, wherein the load balancing logic is configured to assign a different node to any new client accessing the cluster.

13. The system according to claim 12, wherein the client load balancer is further configured to maintain a table for each assignment of a node to a respective combination of: (client IP, target VIP) denoting a specific client.

14. The system according to claim 13, wherein when an existing client tries to access the cluster, the client load balancer checks the table of connections and assigns a node that is not yet connected to that client.

15. The system according to claim 14, wherein in a case that all nodes are connected to that client, the client load balancer assigns the node having least number of connections to that client.

16. The system according to claim 15, wherein a case that all controllers have an equal number of connections to that client, the client load balancer compares the total number of connected clients to each node and selecting the most idle node.

17. The system according to claim 16, wherein, most idle node is determined based on a least one of: minimum number of connections, minimum CPU load.

18. The system according to claim 10, wherein at least one of the nodes comprises a plurality of network adapters each having a unique MAC address, and further applying the logic of the load balancing on the node level.

* * * * *